United States Patent [19]
Fukazawa

[11] Patent Number: 4,831,824
[45] Date of Patent: May 23, 1989

[54] MANIFOLD AND MANUFACTURING METHOD THEREOF

[75] Inventor: Kuzuhito Fukazawa, Yokohama, Japan

[73] Assignees: Mitsui & Co., Ltd., Tokyo; Kokan Kako Co., Ltd., Yokohama, both of Japan

[21] Appl. No.: 129,960

[22] Filed: Dec. 4, 1987

[30] Foreign Application Priority Data

Dec. 25, 1986 [JP] Japan ................. 61-307796

[51] Int. Cl.⁴ .............................. F01N 7/10
[52] U.S. Cl. ........................ 60/322; 60/323
[58] Field of Search ................. 60/322, 323

[56] References Cited

U.S. PATENT DOCUMENTS 3,177,649 4/1965 Tromel ..................... 60/322
4,205,527 6/1980 Rudert ..................... 60/322

FOREIGN PATENT DOCUMENTS 3234376 3/1984 Fed. Rep. of Germany ........ 60/322
1038301 5/1953 France ..................... 60/322
244815 10/1986 Japan ..................... 60/322

Primary Examiner—Douglas Hart
Attorney, Agent, or Firm—Spencer & Frank

[57] ABSTRACT

A manifold which is mounted either on the intake side or on the exhaust side of an internal combustion engine. A main body of a manifold is divided into an end manifold, at least one intermediate manifold and a base manifold. Branch pipes are formed by a bulging process to project upright branch pipes on a side of each manifold, and manifolds are connected on ends with gaskets interposed therebetween so that the bending moment caused by the expansion of metal members due to hot exhaust gases may be absorbed instead of being concentrated on the roots of the manifold to enhance the durability of the manifold.

13 Claims, 2 Drawing Sheets

MANIFOLD AND MANUFACTURING METHOD THEREOF

(BACKGROUND OF THE INVENTION)

This invention relates to a manifold which is branched out to connect valves of an internal combustion engine of an automobile with either a carburetor or a muffler, and a manufacturing method therefor.

(RELATED ART STATEMENT)

There is generally known in the art a manifold for intake/exhaust systems of an internal combustion engine, particularly an exhaust manifold wherein a manifold main body, branched pipes connected to respective cylinders, and flanges for fixing these branched pipes on cylinder blocks are cast-molded and are further coated on the outer periphery thereof for reinforcement purpose as the manifold contains gases of high temperature and pressure. The conventional manifold, however, is defective in that the weight of a manifold itself is heavy and adds an extra weight and bulk to an internal combustion engine to thereby present limitations in the engine layout design.

In order to solve the aforementioned problems, this inventor invented a manifold comprising a manifold main body constructed with a pipe member, plural branch pipes projecting from a side of the pipe member in the direction perpendicular to the axial line of the pipe member, and flanges which are attached on the ends of these branch pipes which is characterized in that either the outer peripheries of said branch pipes at ends thereof or the inner peripheries of the flanges which are inserted into the ends of the branch pipes are provided with circumferential grooves for preventing gas from leaking therefrom and grooves for preventing rotation, and the outer peripheries of the end of branch pipes are caulked (pressure connected) with pressure over the inner peripheries of the flanges (Japanese Patent Application Sho No. 61-124371).

The proposed manifold was made of pipe members including the manifold main body and branches to thereby achieve remarkable reduction in weight and size. However, the pipe member forming the main body of the manifold extends due to the heat of hot gas which is flowing inside to generate a bending moment on the roots or other portions of branched pipes projecting from a side of the main body and connected with the engine. Then, stress concentrates on the roots or the connection with the engine of the branched pipes to cause damages and to deteriorate durability.

The proposed manifold had a problem of the large size of the mold which was necessary to mold the whole manifold integrally. Moreover, as the number of carburetor cylinders and the pitch of branched pipes were fixed in molding, it was necessary to prepare a large number of molds to match the necessary number of types to inevitably push up the manufacturing cost.

(OBJECTS AND SUMMARY OF THE INVENTION)

This invention was conceived to eliminated these problems encountered in the prior art and aims to provide a manifold which can absorb the displacement due to the heat effect with axial extention/contraction of the manifold main body so that the bending moment would not be producedon branched pipes, and manufacturing cost thereof can be reduced, and it aims to offer a method of manufacturing the same.

In order to attain the aforementioned purposes, the first invention of this application is characterized in that the main body thereof comprises an end manifold, intermediate manifolds, and a base manifold, the manifolds respectively having at least one branched pipe, and being molded separately. The connecting ends of each manifold are formed in a manner to freely engage with each other, and connected with each other in an airtight manner via gaskets.

The second invention of this application relates to the method of manufacturing the manifold of the first invention, comprising the steps of (a) dividing a pipe member which is to form a main body of the maifold into an end section, an intermediate section (s) and a base section;

(b) forming at least one projecting pipe on each of the divided pipe members by the bulging process in the direction perpendicular to the axis thereof;

(c) boring a hole on the end face of each of the projecting pipes formed in step (b) respectively, and straightening peripheries thereof to form upright branched pipes for the end manifold, the intermediate manifolds and the base manifold;

(d) forming connecting sections on the connecting ends of each manifold to make them engageable via gaskets, and (e) engaging the section with gaskets to form a manifold.

The manifold constructed as above is remarkably lighter and smaller than those in the related art as the main body and all the other parts in the branched pipes are formed integrally with pipe members.

As the connecting sections or flanges are caulked over the outer peripheries of the branched pipes, no welding process is needed for fixing. Further, as grooves are provided for gas leakage prevention, the manifold will not leak gases even if the gas flowing therein is of high temperature and high pressure like exhaust gas.

(DETAILED DESCRIPTION OF A PREFERRED EMBODIMENT)

The invention will now be described in detail referring to a preferred embodiment of this invention.

Figure 1:
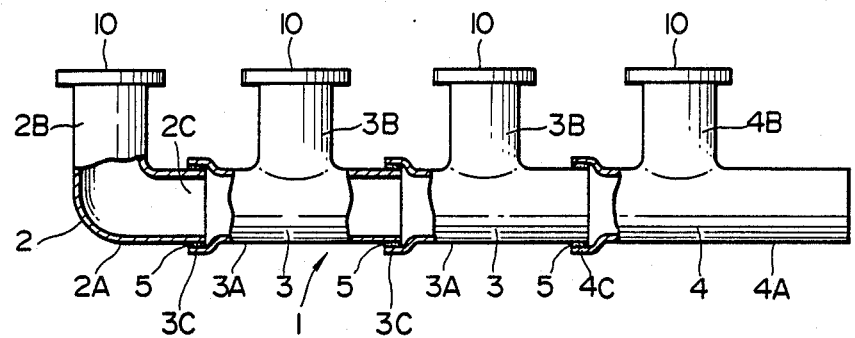
FIG. 1 is a frontal view of an embodiment of the manifold according to this invention partially cutaway.
Figure 2:
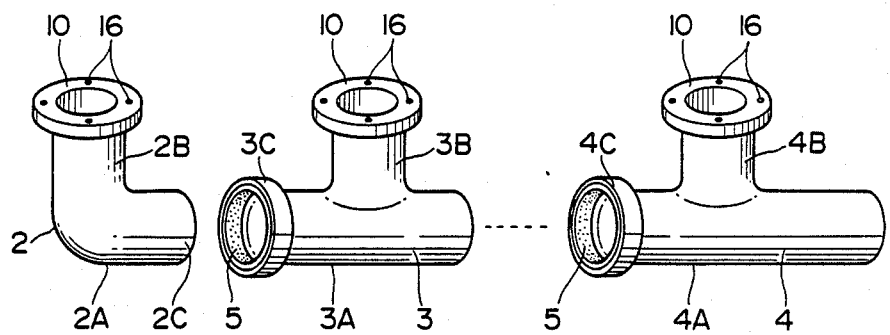
FIG. 2 is an exploded perspective view of the manifold shown in FIG. 1.

The manifold 1 according to this invention is shown in a completed form in FIG. 1 and in an exploded form (before assembly) in FIG. 2, and comprises an end manifold 2, intermediate manifolds 3, and a base manifold 4.

The end manifold 2 is bent at the tip end of a manifold main body section 2A to form an upright branch pipe 2B. The intermediate manifolds 3 have branch pipes 3B formed at the axially middle position on each manifold main body section 3A thereof which projects in the direction perpendicular to the axis of the manifold. The base manifold 4 has a branch pipe 4B formed at a position close to an end of the manifold main body section 4A thereof projecting upright therefrom.

The diameter of downstream ends of the manifold sections 3A and 4A of the intermediate and base manifolds 3 and 4 is increased to form engageable connection ends 3C, 4C which fit in the upstream ends of the manifold sections 2A and 3A of the end and intermediate manifolds 2 and 3, respectively.

The manifold 1 shown in FIG. 1 is assembled by fitting the downstream end 2C of the end manifold 2, the engageable connection ends 3C and 4C of the intermediate manifolds 3, and the base manifold 4 with the downstream ends of the end manifold 2, and intermediate manifolds 3, respectively, with respective gaskets 5. The gaskets may consist of any selected material which withstands the internal temperature (maximum: 880° C.) of the manifold and can seal manifolds air-tightly. For instance, it may be wire inserted asbestos yarns with graphite processed surfaces.

For smoothly fitting the downstream ends of the manifolds with the engageable connection ends 3C, and 4C, the insertion depth of the downstream ends ahould have a certain allowance. The branched pipes 3B, 4B, of the intermediate manifold (s) and the base manifold 3, 4 and the engageable connection ends 3C, 4C are formed by a bulging process by providing a press mold, and forcing pressured fluid into the pipe member after the member is sealed.

Figure 3:
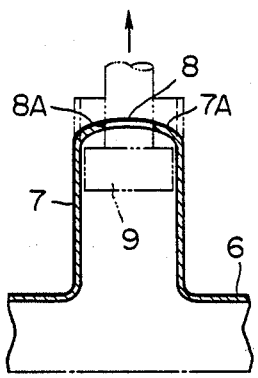
FIG. 3 is a cross section to show an example of the molding process of branched pipes.

The branched pipes 3B, 4B are formed as shown in FIG. 3 by forming a projecting pipe 7 on a side of a pipe member 6, boring a hole 8 of a diameter slightly smaller then the inner diameter of the projecting pipe 7 on an end face 7A thereof, inserting a piece 9 into the pipe 7, and pushing the piece through the pipe end 7 in the direction shown by an arrow to straighten the periphery 8A of the hole 8 into an upright cylindrical wall as shown in broken lines.

The end manifold 2 may be formed by bending a pipe member in advance, and bulging the bent section to correct the diameter or may be formed similarly to the process shown in FIG. 3.

Figure 4:
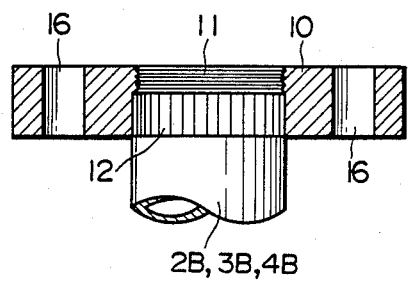
FIG. 4 is an enlarged cross section of a flange member in FIG. 1.
Figure 6:
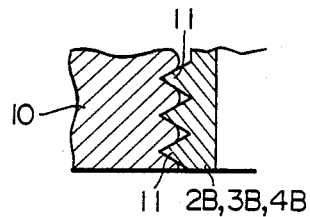
FIG. 6 is a partially enlarged cross section to show the caulked state at gas leak preventing grooves.

The ends of the branched pipes 2B, 3B, and 4B are provided with flanges 10. for connection with cylinder blocks. The flanges 10 are fixed to the branched pipes by caulking (inelastic deformation into sealing contact) as shown in FIG. 4. More particularly, grooves for gas leakage prevention 12 and grooves for rotation prevention 11 are formed on either the interface of the branch pipes 2B, 3B, 4B or the flanges 10 whichever has the higher hardness (on the outer periphery of a branch pipes 2B, 3B, 4B at one end thereof in the figure) to caulk them together. As shown in FIG. 6 the grooves for gas leakage prevention 11 are grooved in a plural number and in parallel to each other in the circumferential direction of the pipes 2B, 3B, 4B to have a serrated cross section.

The grooves for rotation prevention 11 are provided in a plural number on the outer periphery of branch pipes 2B, 3B, 4B in the axial direction or formed spirally or knurled thereon.

Figure 5:
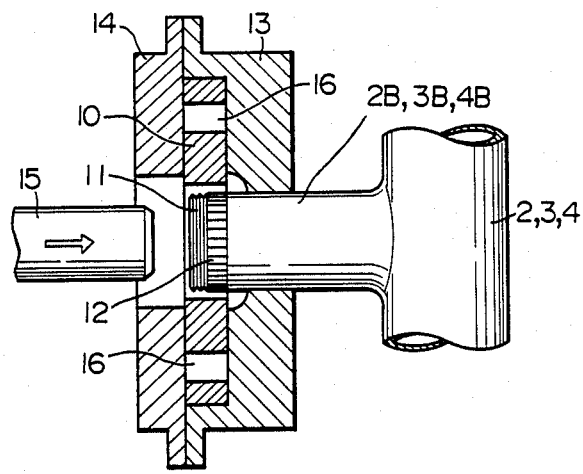
FIG. 5 is a cross section to show an embodiment of the caulking means for the flange member shown in FIG. 1.

In caulking, as shown in FIG. 5, a flange 10 is placed firmly at a predetermined position between holders 13, 14, and an end of branch pipe 2B, 3B or 4B is inserted at the center thereof so that the branch pipes 2B, 3B, 4B may be fixed immovably in the axial direction with a fixing means (not shown). A rod 15 is then forcibly inserted into the branch pipes 2B, 3B, 4B from one end thereof to expand the end portion thereof and caulk them as shown in FIG. 4. As shown in enlargement in FIG. 6, the ridges between the grooves for gas leakage prevention 11 are forced into the internal periphery of the flanges 10, and both members are closely attached to each other. As this close attachment is generated over the plural ridges and grooves, and as adjacent grooves are completely independent of each other axially, the gas can fully be prevented from leaking from the pipe.

As the ridges of the grooves 12 are similarly forced into the internal peripheral surface of the flanges 10, the parts are also fixed integrally in the direction of rotation.

Flanges 10 are provided with bolt holes in a predetermined number to be attached to a cylinder block with bolts or other appropriate means. With the structure described in detail in the foregoing statement, when this invention manifold is applied to an exhaust manifold for a four cylinder engine, it may be formed to have branched pipes on manifolds simply by connecting an end manifold 2, two intermediate manifolds 3, and a base manifold 4 with respective gaskets 5 interposed between respective connections 3C and 4C in an air-tight manner as shown in FIG. 1. The manifold can be used for any type of engines simply by selecting the number of intermediate manifolds 3 according to the number of engine cylinders. It may be used for any type of engines having various dimensions in a cylinder arrangement simply by changing the length of the manifold section 3A of intermediate manifolds 3.

Although when the manifold is heated with the exhaust gas, the diameters of the engageable connection ends 3C, and 4C may become expanded due to thermal expansion, the air-tightness is protected as the downstream ends of the inserted manifolds 2, 3 are expanded thermally at the ratio identical to that of the connection ends. Although the pipe member may become extended axially due to thermal expansion, the displacement caused by the thermal expansion is well absorbed by the allowance given in advance in the insertion depth between members. Similarly, when the thermally expanded pipe member is cooled to contract, the displacement may be well absorbed.

(EFFECTS)

As described in detail in the above description, this invention manifold is assembled with an end manifold, intermediate manifolds and a base manifold each having at least one branch pipe which are formed in ends thereof to be engageable to each other, and which are connected with each other in an air-tight manner with gaskets. Even if extremely hot gas is passed through the manifold to flow over the engaged connection ends to expand/contract the manifolds, the branched pipes of respective manifolds are free of any bending moment.

This invention manifolds is adaptable to any engine having any number of cylinders and of any type simply by changing the number of intermediate manifolds. This invention manifold therefore is free of the troubles in the prior art of preparing a split mold particularly adapted to each of the engine types, and occupies smaller installing space when compared with the related art.

As the manifold main bodies and branch pipes of this invention manifold can be formed by bulging pipe members, its weight can be made remarkably smaller as a whole as compared to the prior art manifold which is generally cast, and can be manufactured at lower cost as it needs no casting.

As this invention manifold can be made smaller and compact, limitations heretofore restricting the layout design of an internal combustion engine may be removed to greatly facilitate the design.

Since the flange is caulked via the grooves for gas leakage prevention, even if gas is caused to flow through the manifold at high temperature and under high pressure like an exhaust manifold, there is no possibility of gas leaking from the manifold. As the grooves for rotation prevention are provided, the connection between the flanges and branch pipes are further reinforced to ensure a solid and firm attachment like in the case of cast manifolds.

What is claimed is:

1. A manifold, comprising an end manifold, at least one intermediate manifold and a base manifold, connected end-to-end in an axial direction with gaskets interposed therebetween in an air-tight manner and each having at least one branched pipe, the end manifold, the at least one intermediate manifold and the base manifold each having a single piece construction formed of a respective pipe member and the at least one branched pipe thereof being integrally formed from the pipe member by a bulging process on one side thereof so as to project in a direction perpendicular to the axial direction of the pipe members.

2. The manifold as claimed in claim 1 wherein either the downstream or upstream connection end of each manifold is increased in diameter.

3. The manifold as claimed in claim 1 wherein flanges are respectively fitted on the branched pipes.

4. The manifold as claimed in claim 3 wherein grooves for gas leakage prevention in the circumferential direction and grooves for rotation prevention are formed on either the outer peripheral surfaces of the ends of branched pipes or the inner circumferential surfaces of the flanges which are fit over the ends of the branched pipes and the branched pipes are fit into the flanges by caulking the outer peripheral surfaces of the pipes forcibly into the internal circumferences of the flanges.

5. The manifold as claimed in claim 4 wherein the gas leakage prevention grooves formed on either the internal circumferential surfaces of the flanges or the outer peripheral surfaces of the branched pipes are provided circumferentially in a plural number and parallel to each other so as to have serrated cross sections.

6. The manifold as claimed in claim 4 wherein the rotation prevention grooves formed either on the outer peripheral surface of the branched pipes or inner circumferential surfaces of the flanges are provided axially in a plural number, or formed spirally or knurled thereon.

7. The manifold as claimed in claim 4 wherein the one of the branched pipes and the flanges having the surfaces on which the grooves are formed has a hardness higher than the other of the branched pipes and the flanges.

8. The manifold as claimed in claim 1 wherein the gaskets are made of a material which can withstand the temperature inside the manifold.

9. The manifold as claimed in claim 8 wherein the gaskets are made of wire inserted asbestos yarns having a graphite processed surface.

10. A manifold, comprising:
an end manifold, at least one intermediate manifold and a base manifold, connected end-to-end in an axial direction with gaskets interposed therebetween in an air-tight manner and each having at least one branched pipe, the end manifold, the at least one intermediate manifold and the base manifold each having a single piece construction formed of a respective pipe member and the at least one branched pipe thereof being integrally formed from the pipe member by a bulging process on one side thereof so as to project in a direction perpendicular to the axial direction of the pipe members; and
flanges having internal circumferential surfaces respectively caulked onto outer peripheral surfaces of the branched pipes.

11. A manifold as in claim 10, wherein the caulking of the internal circumferential surfaces of the flanges onto outer peripheral surfaces of the branched pipes comprises a plastic deformation of the branched pipes into engagement with the flanges.

12. A manifold, comprising:
an end manifold, at least one intermediate manifold and a base manifold, connected end-to-end in an axial direction with gaskets interposed therebetween in an air-tight manner and each having at least one branched pipe, the end manifold, the at least one intermediate manifold and the base manifold each having a single piece construction formed of a respective pipe member and the at least one branched pipe thereof being integrally formed from the pipe member by a bulging process on one side thereof so as to project in a direction perpendicular to the axial direction of the pipe members; and
flanges having internal circumferential surfaces respectively caulked onto outer peripheral surfaces of the branched pipes, one of the outer peripheral surfaces and the internal circumferential surfaces having first grooves for preventing gas leakage in the circumferental direction of the branched pipes and second grooves for preventing rotation of the flanges relative to the branched pipes.

13. A manifold as in claim 12, wherein the caulking of the internal circumferential surfaces of the flanges onto outer peripheral surfaces of the branched pipes comprises a plastic deformation of the branched pipes into engagement with the flanges.

* * * * *